(12) United States Patent
Maki et al.

(10) Patent No.: US 6,428,048 B2
(45) Date of Patent: Aug. 6, 2002

(54) CONNECTING STRUCTURE OF VEHICLE BODY CONSTITUTING MEMBER IN VEHICLE OR THE LIKE

(75) Inventors: Yuji Maki; Yasuhiro Matsumoto, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/818,772

(22) Filed: Mar. 28, 2001

(30) Foreign Application Priority Data

Mar. 28, 2000 (JP) ........................................ 2000-088752

(51) Int. Cl.[7] ........................ B62D 21/02; B62K 19/20; B62K 19/28
(52) U.S. Cl. ........................ 280/796; 280/798; 180/311; 296/205; 296/30
(58) Field of Search ................................ 280/781, 796, 280/798, 788; 180/311; 296/30, 205

(56) References Cited

U.S. PATENT DOCUMENTS 4,662,467 A * 5/1987 Arai et al. .................. 280/781

FOREIGN PATENT DOCUMENTS

| JP | 5-105162 | * | 4/1993 |
| JP | 9-132188 | * | 5/1997 |
| JP | 9-207857 | * | 8/1997 |
| JP | 2001-80564 | * | 3/2001 |
| WO | 00/35738 | * | 6/2000 |

* cited by examiner

Primary Examiner—Peter C. English
(74) Attorney, Agent, or Firm—Birch, Stewart, Kolasch & Birch, LLP

(57) ABSTRACT

A connecting structure for a vehicle for providing strength while achieving a light weight formation for the vehicle body. The connecting structure connects a sub-constituting member to a main constituting member. The main constituting member is formed in an inverse U-shaped section. A reinforcing pin extends along a connecting direction of the sub-constituting member and is provided to penetrate the main constituting member in a vicinity of the sub-constituting member. A connecting member is superposed on the main constituting member, the sub-constituting member, and the reinforcing pin, and is provided at the connecting portion for connecting the main constituting member and sub-constituting member. The connecting member is integrated to the main constituting member, the sub-constituting member and the reinforcing pin respectively by welding. Both end portions of the reinforcing pin are integrated to the main constituting member by welding.

16 Claims, 4 Drawing Sheets

CONNECTING STRUCTURE OF VEHICLE BODY CONSTITUTING MEMBER IN VEHICLE OR THE LIKE

BACKGROUND OF THE INVENTION

1. Field of the Invention

The present invention relates to a connecting structure for a vehicle body constituting member in a vehicle or the like.

2. Description of Background Art

Conventionally, in a vehicle, for example, a saddle-ride type vehicle 1 as shown in FIG. 5, there is provided a pair of left and right main pipes 2 constituting an upper portion of a vehicle body portion. A pair of left and right underpipes 3 are arranged along the lower sides of the main pipes 2 and are connected to the main pipes 2 at front sides thereof. A rear fork 4 is pivotably mounted to rear sides of the underpipes 3 in an up and down direction. An engine 5 is arranged in a space formed by the main pipes 2 and the underpipes 3. The engine 5 is fixed to the underpipes 3. A pair of left and right front wheels 6 are mounted to the left and right sides of the front portions of the main pipes 2, and the underpipes 3, and are movably mounted in an up and down direction. A pair of rear wheels 7 are mounted to the left and right sides of the rear fork 4.

Further, on the front sides of the main pipes 2, a radiator 8 is provided for cooling water circulated to the engine 5, and an oil cooler 9 is provided for cooling oil similarly circulated to the engine 5. At the front portions of the main pipes 2 and on rear sides of the radiator 8 and the oil cooler 9, a steering handle 10 is provided for steering the front wheels 6. Further, on a rear side of the steering handle 10, a fuel tank 11 is provided.

Further, on a rear side of the fuel tank 11, a seat 13 is supported by seat pipes 12 that extend to the rear of the main pipes 2. On a lower side of the seat 13, an air cleaner 14 is provided for cleaning combustion air supplied to the engine 5.

Further, the engine 5 is connected with a silencer 15 for emitting combustion gas to the ambient air and restraining exhaust noises. The silencer 15 is arranged between the seat pipes 12 and the rear wheels 7 and is supported by the seat pipes 12.

In the meantime, the rear fork 4 is pivotably supported by bearings 17 attached to pivot plates 16 provided at rear portions of the underpipes 3.

Further, the left and right main pipes 2, underpipes 3, and seat pipes 12 are connected to each other by a plurality of crosspipes 18 arranged along a width direction of the vehicle 1 and constituting a vehicle body as a whole.

In the meantime, for example, the pivot plates 16 which are one of the vehicle body constituting members, have a strength sufficient for supporting the rear fork 4. For that purpose, the pivot plates 16 are formed by forging or casting or the like, and are integrated to the underpipes 3 or the like by welding.

However, when such pivot plates 16 are formed by forging or casting, there poses a problem that the pivot plates 16 per se become heavy.

The problem is not limited to the pivot plates 16, but is common in almost all the vehicle body members constituting the vehicle body portion.

In order to avoid such a problem, the vehicle body constituting member could be formed in an inverse U-shaped section thereby reducing the vehicle body weight.

However, even by such a method, in order to further ensure the strength of the vehicle body constituting member per se, an improvement of vehicle body structure would be required.

SUMMARY AND OBJECTS OF THE INVENTION

The present invention has been carried out in view of the above-identified problem. It is an object of the present invention to provide a connecting structure of a vehicle body constituting member in a vehicle or the like capable of promoting strength, while at the same time achieving a vehicle body that is light in weight.

In order to achieve the above-described object, according to a first aspect of the present invention, a connecting structure of a vehicle body constituting member of a vehicle or the like is provided. It includes a connecting structure for connecting a main constituting member of a vehicle body portion of a vehicle, and a sub-constituting member connected to the main constituting member. The main constituting member is formed in an inverse U-shaped section. A reinforcing pin is provided along a connecting direction of the sub-constituting member to penetrate a vicinity of a connecting portion of the main constituting member connected to the sub-constituting member. A connecting member is positioned to superpose on the main constituting member, the sub-constituting member and the reinforcing pin and is provided at a corner portion of the connecting portion of the main constituting member and the sub-constituting member. The connecting member is integrated to the main constituting member. The connecting member and the reinforcing pin are connected by welding at respective superposed portions thereof. Further, both end portions of the reinforcing pin are integrated to the main constituting member by welding.

According to a second aspect of the present invention, the connecting structure of a vehicle body constituting member in a vehicle according to the first aspect includes a main constituting member that is a frame member, and a sub-constituting member that is a connecting member for connecting the frame member to another framed member.

According to a third aspect of the present invention, the vehicle is a saddleride type vehicle and the connecting structure of a vehicle body constituting member includes a reinforcing pin projecting at a side portion of the main constituting member, and constituting a pivot shaft of a brake pedal provided to brake the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4(a) and 4(b) show connecting members used in the present invention in which FIG. 4(a) is a side view, and FIG. 4(b) is a front view.

DETAILED DESCRIPTION OF THE PREFERRED EMBODIMENTS

A detailed explanation will be given of an embodiment of the present invention in reference to the drawings as follows. In the following explanation, main constituting members of a vehicle are common to those illustrated in FIG. 5. Accordingly, with respect to the common portions, the same notations are used to thereby simplify the explanation.

Figure 1:
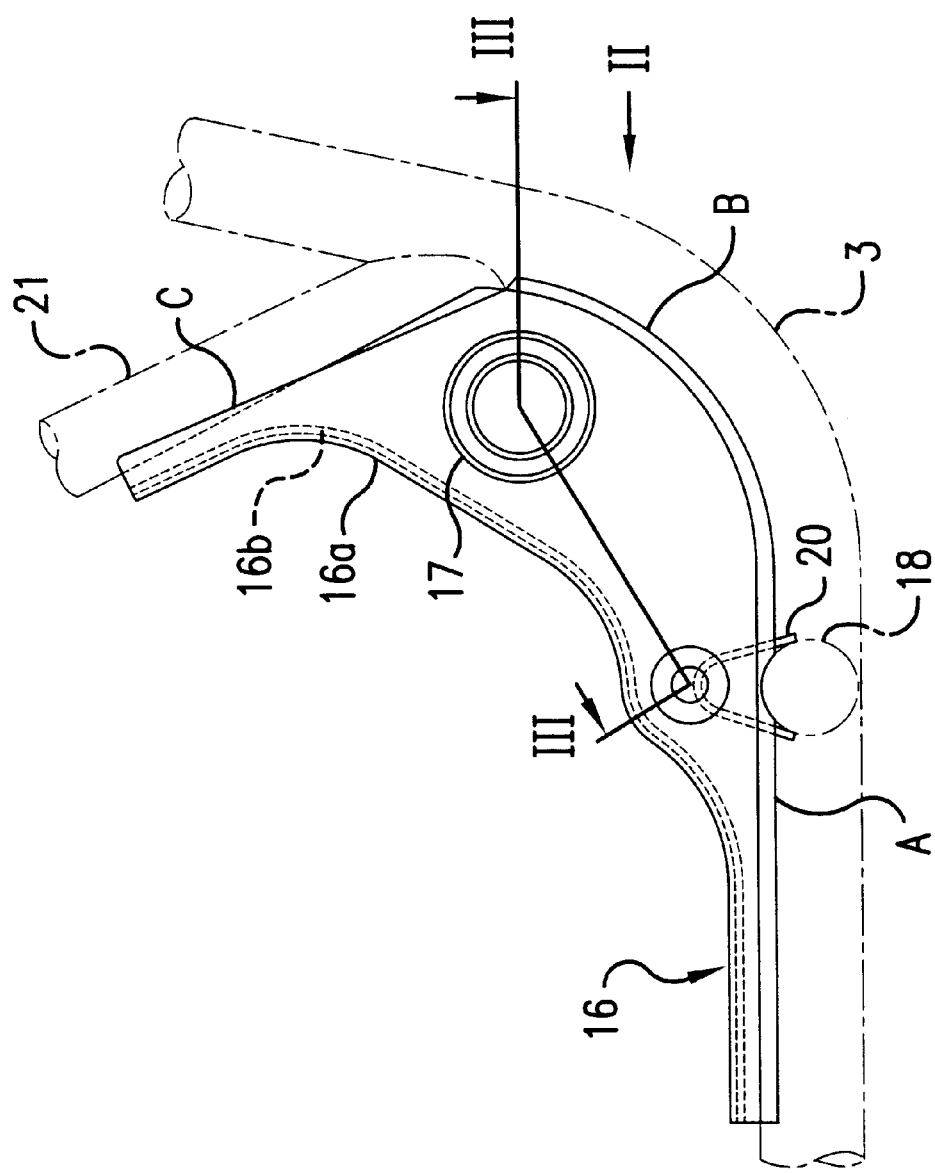
FIG. 1 shows an embodiment of the connecting structure of the present invention and is a side view of essential portions.
Figure 2:
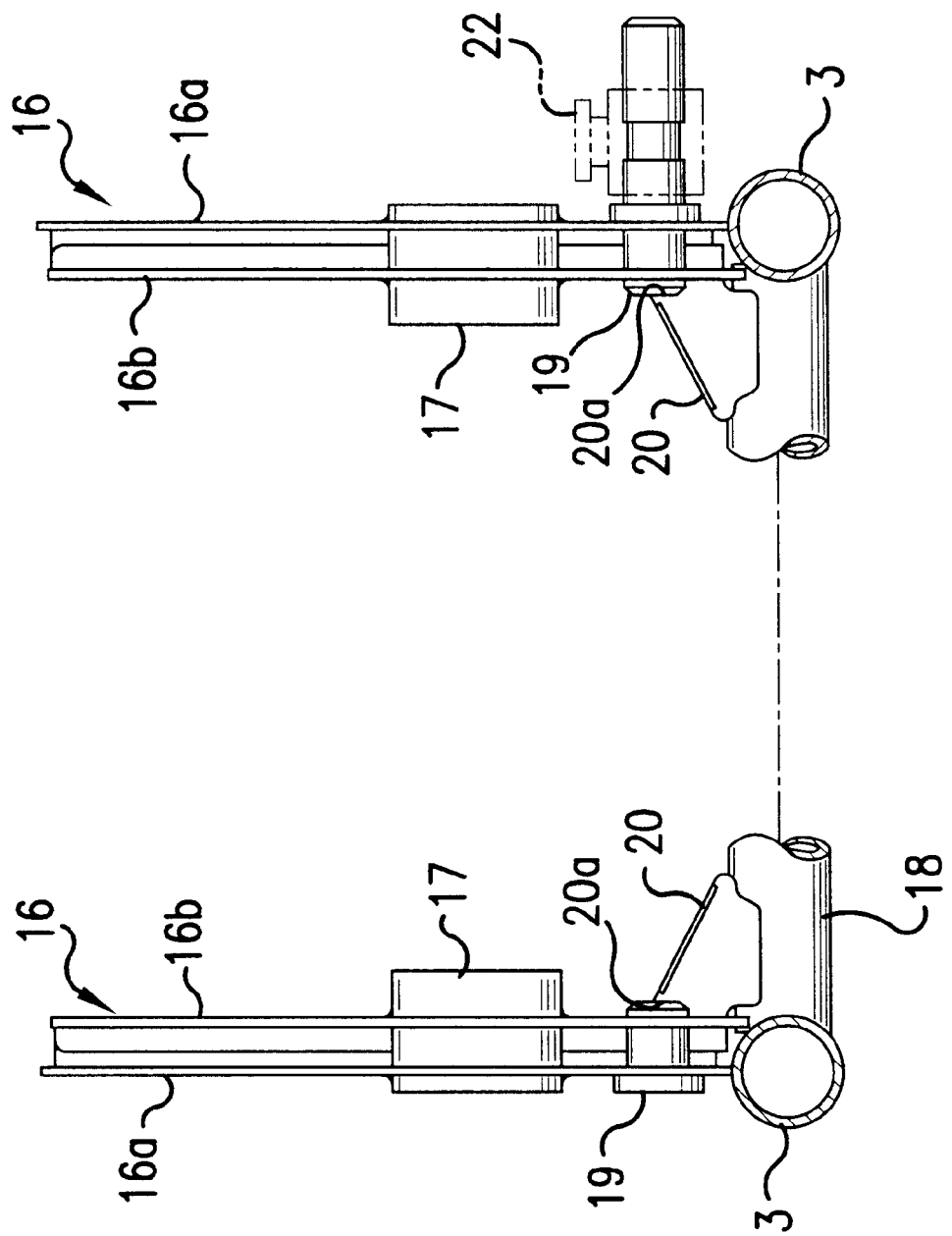
FIG. 2 is a rear view of the connecting structure of the present invention taken along the arrow II direction in FIG. 1.
Figure 3:
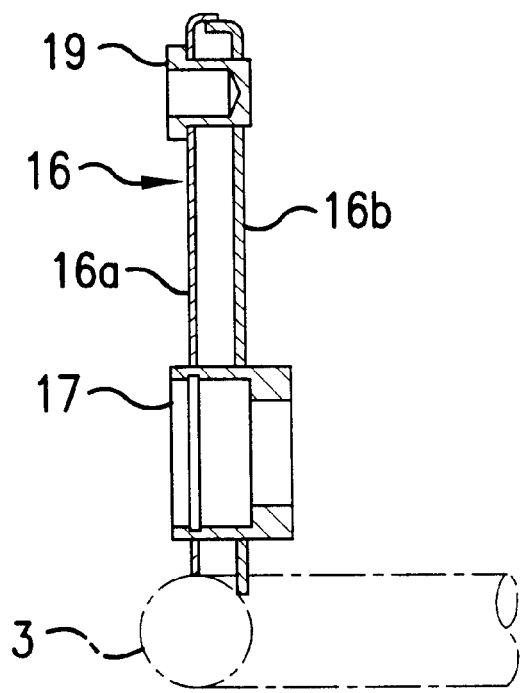
FIG. 3 is a sectional view taken along a line III—III of FIG. 1.

As shown by FIG. 1 and FIG. 2, a connecting structure of a vehicle body constituting member in a vehicle or the like according to the embodiment, is applied to connecting portions for connecting the pivot plates 16 as main constituting members of the vehicle body portion of the saddle-ride type vehicle 1. The crosspipe 18 is provided as a sub-constituting member for connecting the pair of underpipes 3 at rear end portions of lower portions thereof. An outline constitution is constructed in which the pivot plates 16 are formed in an inverse U-shaped section. A reinforcing pin 19 is provided along a connecting direction of the crosspipe 18 to penetrate in a vicinity of a connecting portion of each pivot plate 16 connected to the crosspipe 18. The connecting members 20 are made to superpose on the pivot plates 16, the crosspipe 18 and the reinforcing pins 19, and are provided at a corner portions of the connecting portions for connecting the pivot plates 16 and the crosspipe 18 . Further, the connecting members 20 are integrated to the pivot plates 16, the crosspipe 18 and the reinforcing pins 19 by welding at respective superposed portions thereof. Further, both end portions of the reinforcing pins 19 are integrated to the pivot plates 16 by welding.

Figure 5:
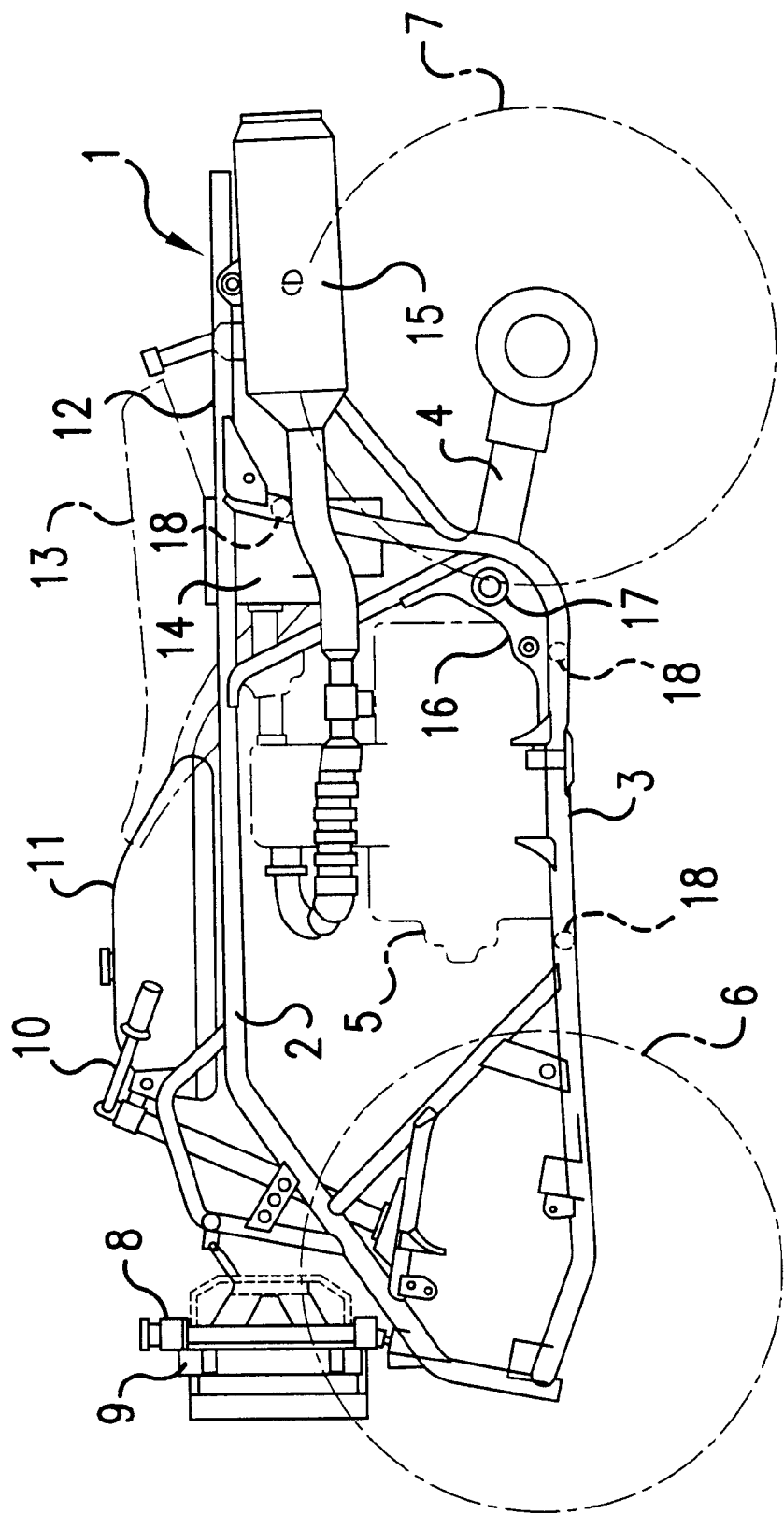
FIG. 5 is an outline side view showing a saddle-ride type vehicle incorporating the connecting structure of the present invention.

Further, as illustrated in FIG. 1 and FIG. 5, rear end portions of the underpipes 3 are bent toward upper sides by a predetermined radius of curvature. At front portions of the bent portions, the pair of left and right underpipes 3 are connected to each other by the crosspipe 18.

Further, portions of terminal ends of the bent portions of the underpipes are connected with connection pipes 21 extending from the underpipes 3 in a skewed upper front direction. The other ends of the connection pipes 21 are connected to the main pipes 2, thereby connecting the respective underpipe 3 and the main pipe 2.

As shown by FIG. 2, the pivot plates 16 are constituted by a pair of plate constituting members 16a and 16b which are press-formed such that sections thereof constitute substantially an L-like shape. Further, the pivot plates 16 are formed to have inverse U-shaped cross sections in which a lower side and a rear side thereof are opened by superposing and welding bent portions of the plate constituting members 16a and 16b.

Further, as shown by FIG. 1, a lower portion of each pivot plate 16 is constituted by a linear portion A formed in a linear shape in a front and rear direction of the saddle-ride type vehicle 1, and a curved portion B which is continuous to a rear side of the linear portion A and having a radius of curvature substantially the same as that of the bent portions of the underpipes 3. Further, the curved portion B is changed to a second linear portion C constituting a predetermined angle relative to the linear portion A.

Further, for each pivot plate 16, the linear portion A is butted to a front side of the bent portion of the underpipe 3, the curved portion B is butted to the bent portion of the underpipe 3, and the second linear portion C is butted to the connection pipe 21, respectively. Each pivot plate 16 is then welded to cover portions of the side faces of the respective pipes by the two plates constituting members 16a and 16b, to thereby fixedly be attached thereto.

In the meantime, at a position the pivot plates 16 are attached as described above, opposed to the crosspipe 18, the reinforcing pins 19 are penetrated to be in parallel with the crosspipe 18. Both end portions of each reinforcing pin are integrated to the respective plate constituting members 16a and 16b by welding.

Figure 4A:
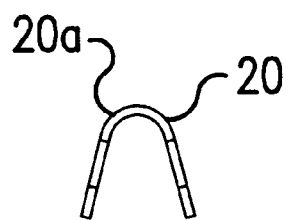
Figure 4B:
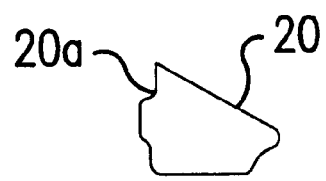

As shown by FIG. 4(a), the connecting member 20 is formed by press-forming such that a section thereof constitutes an inverse U-shape. Further, substantially a right triangle is constituted in a side view, as shown by FIG. 2, and an orthogonal side portion thereof is butted to the crosspipe 18 to envelope a portion of an upper side thereof. In addition, the other orthogonal side portion is butted to a side face of the respective pivot plate 16, and is integrated thereto by welding.

Further, a recess 20a is formed at an upper portion of the other side portion of the connecting member 20, and one end portion of the respective reinforcing pin 19 is engaged with the recess 20a and integrated thereto by welding in the engaged state.

In this way, according to the embodiment, the pivot plates 16 are connected to the underpipes 3 and the connection pipes 21 and further are connected to the crosspipe 18 via the reinforcing pins 19 and the connecting members 20.

According to such a connecting structure, the connecting portions for connecting the pivot plates 16 and the crosspipe 18 are made to be a rigid structures by the reinforcing pins 19 and the connecting members 20, and both are solidly connected.

Further, by promoting the rigidity of the connecting portions, a load operating on the pivot plates 16 is supported to be dispersed smoothly by the crosspipe 18. As a result, the load on the pivot plates 16 is shared by other components of the connecting structure, thereby permitting the design strength of the pivot plates 16 to be reduced.

Therefore, as shown by the embodiment, even when the pivot plates 16 are constituted by a shape of an inverse U-shaped section, sufficient durability is achieved, in accordance therewith. Thus, pivot plates 16 can be lightweight.

Further, the various shapes, dimensions and the like of the respective constituting members shown in the above-described embodiment, are only an example.

Other configurations of the main constituting members, the sub-constituting members and the connecting portions can be set arbitrarily.

For example, according to the above-described embodiment, an example is set forth wherein the main constituting members are made as the pivot plates 16 and the sub-constituting member is made as the crosspipe 18, and the present invention is applied to the connecting portions for connecting these elements. In place thereof, for example, the rear fork 4 may be constituted by a pair of pivoting arms having a box shape section and a crosspipe connecting these, and the connecting structure of the present invention can be applied to a connecting portion for connecting the pivoting arms and the crosspipe.

Further, the present invention is also applicable when a frame member such as a main frame or a down tube of a motor cycle is formed in a box shape section, and pairs of the frame members are connected by crosspipes to thereby constitute the frame.

Further, as shown by FIG. 2, for example, when a vehicle is a saddle-ride type vehicle, it is possible that one end portion of the reinforcing pin 19 projects outwardly as shown by a chain line in the drawing. In this situation, a brake pedal 22 that is used for braking the vehicle may be supported by a projecting portion of the reinforcing pin 19. Also, a bearing 17 may be provided for connecting a rear wheel frame member to the vehicle.

Or, it is also possible that the reinforcing pin 19 projects to an inner side of the vehicle, and may be utilized as a supporting member of various apparatus arranged on the inner side.

Since the present invention is constituted as described above, the connecting portion for connecting the main constituting member and sub-constituting member can be made as a rigid structure since the reinforcing pin and the connecting member are both solidly connected.

Further, by promoting the rigidity of the connecting portion, the load operating on the main constituting member can be smoothly dispersed to the sub-constituting member to thereby alleviate the load shared by the main constituting member. Thus, the design strength of the main constituting member can be reduced.

Therefore, even when the main constituting member is formed in the shape of the inverse U-shaped section, sufficient durability can be achieved, in accordance therewith. In addition, a light weight formation of the main constituting member can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A connecting structure for a vehicle body for connecting a main constituting member of a vehicle body portion of a vehicle and a sub-constituting member connected to the main constituting member, comprising:
   the main constituting member is formed in an inverse U-shaped section;
   a reinforcing pin extending along a connecting direction of the sub-constituting member and penetrating a connecting portion of the main constituting member that is connected to the sub-constituting member;
   a connecting member secured to the main constituting member, the sub-constituting member and the reinforcing pin, said connecting member being provided at the connecting portion of the main constituting member;
   the connecting member being integrated to the main constituting member, the sub-constituting member and the reinforcing pin by welding at respective portions thereof; and
   both end portions of the reinforcing pin are integrated to the main constituting member by welding.

2. The connecting structure for a vehicle body according to claim 1, wherein the main constituting member is a frame member and the sub-constituting member is a connecting member for connecting the frame member to another frame member.

3. The connecting structure for a vehicle body according to claim 2, wherein the reinforcing pin is provided to project from a side portion of the main constituting member and constitutes a pivot shaft of a brake pedal provided to brake the vehicle.

4. The connecting structure for a vehicle body according to claim 1, wherein the connecting member is triangular in cross section for providing a first enlarged area for welding to said main constituting member and a second enlarged area extending along the sub-constituting member for welding thereto.

5. The connecting structure for a vehicle body according to claim 4, wherein said connecting member has an inverse U-shape for welding two sections of the first enlarged area to the main constituting member and for welding two sections of the second enlarged area to the sub-constituting member.

6. The connecting structure for a vehicle body according to claim 1, further including an underpipe supporting the main constituting member, said main constituting member being curved to accommodate curvature of said underpipe.

7. The connecting structure for a vehicle body according to claim 1, wherein said main constituting member includes a first plate and a second plate, said first and second plates being welded on a first side to each other and being welded on a second side to the vehicle body.

8. The connecting structure for a vehicle body according to claim 1, wherein said main constituting member includes a first end for welding to the vehicle body, a second end for welding to a connecting pipe, and an enlarged central portion for mounting the reinforcing pin and said connecting member and for securing the connecting member to the main constituting member and the reinforcing pin.

9. A connecting structure for a vehicle body, the vehicle body being a portion of a vehicle, comprising:
   an underpipe;
   a crosspipe secured to said underpipe;
   a main plate member including a first end, a central portion and a distal end;
   a reinforcing pin having a first end and a second end, said reinforcing pin extending substantially parallel to said crosspipe and penetrating the central portion of said main plate member;
   a connecting member mounted adjacent to the main plate member, the crosspipe and the reinforcing pin, said connecting member being integrated to the main plate member, the crosspipe and the reinforcing pin by welding at respective adjacent portions thereof; and
   said first end and said second end of said reinforcing pin being integrated to the main plate member by welding.

10. The connecting structure for a vehicle body according to claim 9, wherein the main plate member is a frame member and the crosspipe is a connecting member for connecting the frame member to another frame member.

11. The connecting structure for a vehicle body according to claim 10, wherein said reinforcing pin being provided to project from a side portion of the main plate member for providing a pivot shaft of a brake pedal provided to brake the vehicle.

12. The connecting structure for a vehicle body according to claim 9, wherein the connecting member is triangular in cross section for providing a first enlarged area for welding to said main plate member and a second enlarged area extending along the crosspipe for welding thereto.

13. The connecting structure for a vehicle body according to claim 12, wherein said connecting member has an inverse U-shape for welding two sections of the first enlarged area to the main plate member and for welding two sections of the second enlarged area to the crosspipe.

14. The connecting structure for a vehicle body according to claim 9, wherein said main plate member is curved to accommodate curvature of said underpipe.

15. The connecting structure for a vehicle body according to claim 9, wherein said main plate member includes a first plate and a second plate, said first and second plates being welded on a first side to each other and being welded on a second side to the underpipe.

16. The connecting structure for a vehicle body according to claim 9, wherein said main plate member includes a first end for welding to the underpipe, a second end for welding to a connecting pipe, and an enlarged central portion for mounting the reinforcing pin and said connecting member and for securing the connecting member to the main plate member and the reinforcing pin.

* * * * *